United States Patent [19]
Morrison Jr.

[11] Patent Number: 4,866,640
[45] Date of Patent: Sep. 12, 1989

[54] TEMPERATURE COMPENSATION FOR PRESSURE GAUGE

[75] Inventor: Charles F. Morrison Jr., Boulder, Colo.

[73] Assignee: Granville-Phillips Company, Boulder, Colo.

[21] Appl. No.: 87,409

[22] Filed: Aug. 20, 1987

[51] Int. Cl.$^4$ .................. G06F 15/20; G01L 19/04
[52] U.S. Cl. .................... 364/558; 364/557; 364/571.03; 307/491; 73/708
[58] Field of Search .......... 364/557, 558, 571, 571.03; 73/1 G, 4 R, 708, 766; 307/491

[56] References Cited

U.S. PATENT DOCUMENTS

| | | | |
|---|---|---|---|
| 3,004,434 | 10/1961 | Heise | 73/708 |
| 3,905,237 | 9/1975 | Smalarz et al. | 73/393 |
| 4,000,643 | 1/1977 | Pearson | 73/88.5 R |
| 4,084,248 | 4/1978 | Scott | 364/571 |
| 4,192,005 | 3/1980 | Kurtz | 364/571 |
| 4,392,382 | 7/1983 | Myers | 73/708 |
| 4,399,515 | 8/1983 | Gross | 364/571 |
| 4,464,725 | 8/1984 | Briefer | 364/571.03 |
| 4,468,968 | 9/1984 | Kee | 73/708 |
| 4,547,859 | 10/1985 | Wiggins | 364/571 |
| 4,556,807 | 12/1985 | Yamada et al. | 307/491 |
| 4,598,381 | 7/1986 | Cucci | 364/558 |
| 4,607,530 | 8/1986 | Chow | 364/558 |
| 4,644,482 | 2/1987 | Juanarena | 364/558 |
| 4,675,834 | 6/1987 | Furuse | 364/557 |
| 4,715,003 | 12/1987 | Keller et al. | 364/557 |

OTHER PUBLICATIONS

W. G. Brombacher, NBS Technical Note 298, 2/3/67, pp. 27 and 54.

Primary Examiner—Parshotam S. Lall
Assistant Examiner—Brian M. Mattson
Attorney, Agent, or Firm—Gerald J. Ferguson Jr.

[57] ABSTRACT

A "pressure" gauge which measures density of a gas in a vacuum system is temperature-compensated to give more accurate pressure readings by taking into account the actual gas temperature in the gauge as well as the temperature of the gas during calibration of the gauge. The calibration is for gauge output current versus measured gas pressures; during calibration, the gas temperature is also measured. During pressure measurement gas temperature is measured in the gauge and a microcomputer is used for computations and for lookup of calibration pressure values which nominally corespond to gauge output current values. The output current is first compensated for temperature correction by multiplying it by the actual absolute gas temperature and dividing the product by the absolute calibration gas temperature. This new temperature-compensated output current is used by the microprocessor to access the stored calibration data and to provide a temperature-compensated pressure value.

16 Claims, 2 Drawing Sheets

TEMPERATURE COMPENSATION FOR PRESSURE GAUGE

BACKGROUND OF THE INVENTION

1. Field of the Invention

The present invention relates to a method for automatic temperature compensation of gas density gauges. Such gauges include cold and hot cathode type ionization gauges as well as heat loss gauges such as Pirani and thermocouple gauges. Such automatic temperature correction in the aforesaid gauges permits them to be more accurately used in the measurement of pressure. The concepts of the present invention can be applied to ionization gauges, heat loss gauges, and other types of gauges. The ionization type of gauge is discussed in greater detail hereunder.

Pressure measurement can result from the collision of gas molecules with a sensing surface. The pressure effect is a product of the number of molecules striking a unit surface per unit time and their average energy. The same pressure reading at a higher gas temperature where there is greater average energy per molecule, must thus have proportionately fewer gas molecules contacting the sensor per unit time.

A gas density gauge, however, measures only the relative number of molecules present—without concern for their average molecular energy. Thus, the density is an incomplete measure of the pressure, and those "pressure" gauges which measure only the density will be in error from this effect.

The universal gas law is shown in Eq. 1 where P is pressure, V is volume, n is moles of gas, $$PV = nRT \qquad \text{(Eq. 1)}$$

R is a constant, and T is the absolute temperature. Gas density is in units of moles of gas/volume. Solving for density gives Equation 2.

$$\text{density} = n/V = (1/R)(P/T) = P/RT \qquad \text{(Eq. 2)}$$

The density is, therefore, proportional to the measured pressure divided by the measured temperature. Thus, the local density is inverse to the local absolute gas temperature. A density gauge can thus indicate a wide range of values at a fixed pressure, depending upon the absolute temperature of the gas in the sensitive part of the gauge at the time of making the measurement.

2. Description of the Prior Art

Devices are well-known in the prior art for use as temperature compensating pressure transducers which transduce pressure directly. Such pressure transducers transduce pressure directly into another variable such as displacement change or frequency change. This transduced variable may then be transduced into a second variable such as capacitance change, change in strain, and possibly even into several other variables before being transduced to an electrical voltage which is processed and displayed as the measured pressure. Each of these variables may be influenced by transducer temperatures and cause the measured pressure to be inaccurate by a fraction of a percent to several percent of the reading if the transducer temperature changes sufficiently. Therefore, for accurate pressure measurement, compensation must be provided for temperature induced changes in the physical dimensions of the transducer or changes in first, second or higher order variables. See for example, U.S. Pat. No. 4,607,530 to Chow wherein frequency changes are compensated.

The recent patent literature contains references to such aforementioned temperature compensated pressure gauges. The foregoing patents, which are discussed further hereunder, all seem to correct for the errors of the transducer only when it is operated at specified temperatures. Although the transducers measure pressure, they give incorrect indications at some temperatures.

The pressure is an independent variable—it should be possible to correctly measure pressure independently of the transducer temperature. Note that the situation under discussion is somewhat different from that of a gas trapped, as by a valve, in the transducer. The pressure of such a gas in a fixed volume does indeed respond to the absolute temperature of the gas, but that is not the case of concern here, though in Smalarz et al., U.S. Pat. No. 3,905,237, that principle is used to create compensating mechanisms for the range and zero of a pressure gauge, but not to make the fundamental measurement itself.

The U.S. Pat. No. 4,468,968 to Kee teaches that the temperature is that of the transducer assembly and also teaches of adjusting the voltage supply so that the electrical value of the output equals the assigned electrical value corresponding to the combination of parameter values. The patent to Kee does not consider gas density, per se, but rather refers broadly to this concept along with all other types of measurement.

U.S. Pat. No. 4,464,725 to Briefer works only with force systems, so the temperature correction is for the non-linearity of the transducer with temperature changes of the transducer.

Gross, in U.S. Pat. No. 4,399,515, also works with force systems, including those with multiple transducers. Thus, such corrections are also usable for transducer corrections with changing transducer temperature.

In the U.S. Pat. No. 4,392,382, to Meyers, there are taught direct pressure sensing capacitance manometers. The temperature related corrections are for transducer temperature correction.

Kurtz, in U.S. Pat. No. 4,192,005 teaches use of strain gauges and pertains to measurement of pressures. The temperature correction removes the sensitivity and zero shifts caused by changes in transducer temperature.

Pearson in U.S. Pat. No. 4,000,643 also uses strain gauges, and also pertains to pressure, and corrections taught therein are for transducer temperature problems.

Heise in U.S. Pat. No. 3,004,434 works with Bourdon tube gauges which sense pressure directly. This patent appears to be limited very specifically to such technology.

Cucci in U.S. Pat. No. 4,598,381 covers a differential pressure sensor (or set of sensors) and applies corrections to these only.

Yamada et al., U.S. Pat. No. 4,556,807, teaches a semiconductor diaphragm which responds to pressure. Located on the diaphragm is also a temperature sensor to correct the transducer response for changes in the diaphragm temperature.

Chow in U.S. Pat. No. 4,607,530, teaches a fast acting thermal sensor to determine the temperature at one point on a quartz crystal resonator gauge. The gauge senses pressure, and the thermal data is used in conjunction with a computer model to establish its effect on the pressure reading.

Scott, in U.S. Pat. No. 4,084,248, also teaches a general method for correcting errors from any transducer due to an independent error source, such as temperature. However, the technology employed is a specific type of look-up table that is outside the field of the present invention.

Juanarena, in U.S. Pat. No. 4,644,482, is a vibrating cylinder pressure gauge with a means for detecting the temperature of the transducer.

In the foregoing references a number of pressure gauges are taught, i.e., gauges that respond to force on a given area. These gauges have no fundamental temperature errors caused by the pressure changing with temperature. Their mechanisms are responsive to temperature changes by changing of the zero point of the gauge itself and by any changes in the response of the transducer used therewith. These changes can result from temperature changes occurring in various parts of the device, and have no direct relationship to the temperature of the gas.

The situation regarding density sensitive gauge elements, however, is just the reverse. The indication of such a gauge does not respond to the temperature of the gauge assembly by any measurable extent, but only to the temperature of the gas itself. The various electrodes in these density gauges can be at widely different temperatures—from white hot to near room temperature. Most often these gauges are of a very open format such that gas is not retained by any of the elements in any sense. If the temperature of one element of such a gauge is chosen as being representative of the gas temperature, this can generate an inconsistency if that element is not heated almost solely by the gas, or unless it restricts gas motion such that it totally determines the temperature of the contained gas. Such situations will usually occur only if intended by careful design.

Direct pressure transducers are rarely used for sensing pressures below pressures of about $1 \times 10^{-3}$ Torr, and are rarely used for directly transducing pressure to another physical variable such as displacement. The force per unit area exerted by the rarified gas at low pressures is too small to be simply and conveniently transduced into an easily measurable displacement (of an indicator needle, for example) or other similar variables, using presently available technology.

To measure pressures below about $1 \times 10^{-3}$ Torr conveniently and simply, gauges such as ionization gauges and discharge gauges are commonly used. The output of ionization and discharge gauges as well as that of other types, such as Pirani gauges, depends not on the gas pressure but rather on the gas density in the transducer. The output of these types of gauges depends on the number of atoms or molecules of gas present in the transducer and thus on the gas density. The very name "ionization gauge" implies action on individual molecules of gas. Such gauges are herein termed "gas density dependent pressure transducers" to distinguish them from direct pressure transducers such as strain gauges.

It is well-known that gas density varies inversely with the absolute temperature of the gas in different parts of the system. When the gas temperature rises in one portion of the system relative to another, the gas density in the hotter portion decreases relative to that in the cooler portion. To provide an accurate pressure measurement using a gas density dependent transducer, the gas density in the transducers must be corrected for the effects of gas temperature. This is to be contrasted with temperature compensation for direct pressure transducers wherein the correction is applied because of temperature induced changes in the properties of the transducer itself—not because of changes in the medium being measured.

Existing gas density dependent transducers are commonly calibrated against a pressure standard and serve to measure gas pressure reasonably well only so long as the gas temperature in the transducer remains the same as was the gas temperature in the transducer during calibration. If the gas temperature changes, significant errors will exist in the pressure measurement. For example, a gas temperature change of 30° C. from calibration to actual use will produce approximately an 8% error in the pressure measurement in a typical ionization gauge and a 10% error in a typical Pirani gauge. At a typical bakeout temperature of 450° C., the pressure measurement error using an ionization gauge is approximately 50% due to gas density change. Proportional errors exist for temperature changes intermediate to those cited above. Such errors cannot be ignored for many applications.

It has been well-known for almost two centuries that gas density varies inversely with absolute temperature. It has been known since the invention of the Pirani gauge circa 1906 that such gauges transduce gas density and not pressure. Thus, it has been known for many years that such errors exist in gas density dependent transducers. Heretofore, there has not previously been made a serious effort to correct for such errors. Indeed, it appears that such errors have sometimes been treated as inconsequential when they are indeed not inconsequential.

In National Bureau of Standards Note 298, dated Feb. 3, 1967, page 27, in analyzing errors in ionization vacuum gauges, the author states " . . . It is generally assumed, at least to a first approximation, that the rate of ionization in the gauge is proportional to the gas density. Safely, minor changes in envelope temperatures will not appreciably affect the rate of ionization, and therefore not affect the gauge indication. Two assumptions will be made: first that the gas and envelope temperatures are the same, and second, that equilibrium conditions exist in the gauge and vacuum system. If the temperature of the envelope is changing, adsorption and desorption and degassing in the gauge are far more significant on the indication of the ionization gauge than the direct effect of changes in gas temperatures."

The author of the above quote further states that if "the envelope temperature differs from that at which the gauge was calibrated, the pressure" P will equal $P_i (T/T_o)$, where $P_i$ is the indicated pressure, $T_o$ is the envelope temperature at which the gauge was calibrated, and T is the envelope temperature. The author further states "Ordinarily this correction is not applied, first because the additional accuracy obtained is usually insignificant, and second, because envelope and gas temperatures are not necessarily related, particularly in a hot cathode gauge. It is impractical to measure the gas temperatures."

Ionization gauges are commonly calibrated in air conditioned laboratories such as exist at the National Bureau of Standards. They are often then placed in use deep within a complex vacuum system next to large horsepower mechanical pumps or next to high wattage diffusion pumps where the prevailing temperature is often at least 60° to 70° C. Thus, the temperature change is often about 40° C. from calibration to actual use. This change will cause an error in a typical gauge of about 10% and in a typical Pirani gauge of about 14%. Such errors are significant for many applications.

In addition to changes in gas temperature induced by changes in ambient temperatures, there are larger changes induced by changes in cathode heater power. When the cathode (the electron emitter) is clean and new, the power required to produce a constant electron emission is minimal. When the cathode is contaminated or near the end of its life, the required power may increase several times. Thus, the gas temperature may change significantly because of changes in the power required to maintain a constant electron emission. When such temperature changes are added to typical ambient temperature changes, pressure measurement errors of 20 to 30% can easily exist in gas density dependent gauges.

A possible reason such errors have been ignored is that for many vacuum process applications it is not strictly necessary to know the exact value of the pressure. It is only necessary to be assured that the gas pressure, whatever it may be, is the same in the process from run to run. Thus, it may have been erroneously assumed that as long as the gauge indication was the same run to run that the gas pressure remained the same run to run. This assumption is incorrect as discussed hereunder.

Clearly, there is a need for a convenient and reliable method for the temperature compensating of gas density dependent pressure transducers.

It is an object of the present invention to provide a method for compensating density dependent pressure gauges for temperature changes.

A further object of the present invention is to provide a method for automatically and accurately providing a pressure measurement that is temperature compensated.

DETAILED DESCRIPTION OF THE INVENTION

In order to illustrate this method, it is helpful to consider an ionization gauge transducer, such as that described in U.S. Pat. No. 4,636,680, which is to be used to measure the pressure of gas in a vacuum system. The transducer is used with an ionization gauge controller, such as is available as Granville-Phillips Cat. No. 307 001, which serves to supply controlled voltages to the electrodes, power the electron emitter, control the emission and measure the ion current as is well-known in the art.

Figure 1:
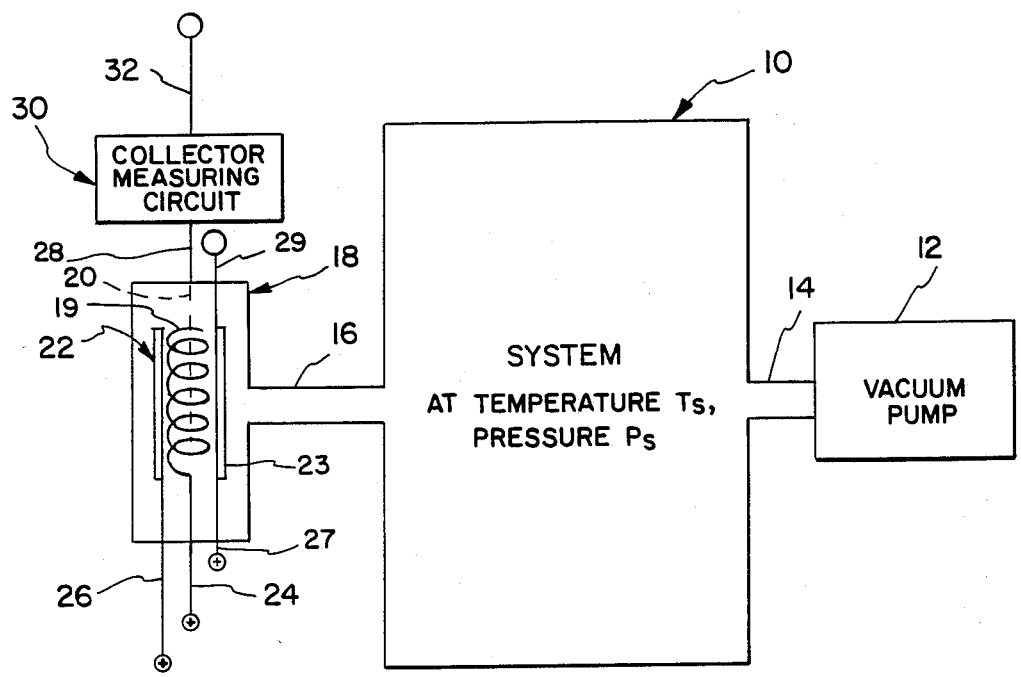
FIG. 1 is a schematic view of an ionization gauge and vacuum system as used in the present invention.

The transducer is fitted with a temperature sensor such as a tungsten ribbon or coil which is in good thermal contact with the gas in the transducer. As illustrated in FIG. 1 and discussed below, a second electron emitter may be used for this purpose. An auxiliary heater may also be used for this purpose which serves to heat the IG (ionization gauge) to outgassing temperature as is well known in the art. The temperature sensor material is selected to have a suitable temperature coefficient of resistance so that by measuring the resistance of the sensor, the temperature of the sensor may be ascertained. Such means of measuring temperature are well-known. Other means such as a thermocouple may also be used.

It is not necessary that the temperature sensor be at exactly the gas temperature but only that it move up and down in temperature in step with the gas temperatures. The closer the temperature of the sensor is to the actual gas temperature and the smaller its thermal mass, the more accurate will be the temperature measurement of the gas.

Prior to use in measurement of vacuum system pressure, the above described assembly of transducer, temperature sensors and controllers is calibrated by any of a number of well-known measurements. The National Bureau of Standards offers such a calibration service as do a number of commercial laboratories. As an example of this general method, a detailed description is provided of the treatment of a density transducer, which is somewhat non-linear in density response, but responds to changes in temperature in a manner proportional to the ratio of absolute gas temperature to absolute calibration temperature. During calibration of the assembly, the calibration system pressure is scanned over a suitable range, and the corresponding calibration pressures and indicated pressures are recorded in a table as is well-known in the art. In addition, the gas temperature in the transducer is recorded.

This table of known pressure values, $P_o$, indicated pressure values, $P_i$, and indicated gas temperatures $T_o$, is stored for future use in the memory of the ionization gauge controller. Such storage can be accomplished using a number of microprocessor electronic techniques which are well-known in the art.

It is observed experimentally that the indicated pressure tends to vary smoothly and predictably point to point with changes in the calibration pressure and that indicated pressure varies smoothly and predictably point to point with the gas temperature. Therefore, a preferred method of storage of the table of calibration information is by means of one or more mathematical equations which relate one variable to another variable to accurately describe the three dimensional mathematical surface defined by the calibration pressures and temperatures.

Generating mathematical equations from such data is called curve fitting and is a technique well-known in the art.

The resulting mathematical equations relating $P_o$ to $P_i$, and $P_i$ to $T_i$ may be used to calculate the value of $P_o$ corresponding to any $P_i$ and $T_i$ simply by substituting the values of $T_i$ and $P_i$ into the equations and evaluating the equations as is well-known in the art.

Storage of such equations is much more convenient and more useful than is a table of values of $P_o$, $P_i$, and $T_i$. However, either means of storage, or any other storage means, can be used so long as the required information is available for subsequent use in the ionization gauge controller memory.

FIG. 1 illustrates the system 10 having a system temperature $T_s$ and a system pressure $P_s$. The system 10 is evacuated to a very low pressure through conduit 14 by a high vacuum pump 12, which pump may be any type of pump suitable for this application.

The system pressure is measured by an ionization gauge 18 which senses the pressure of the system 10 via a conduit 16. The ionization gauge 18 has an anode 19, a collector 20, a second electron emitter 23 a filament 22, and used as a temperature sensor and leads 24, 26, 27, and 29. The ionization gauge 18 is connected to a collector measuring circuit 30 by line 28. The ionization gauge 18 serves as a transducer. Output line 32 is used to transmit the output of the collector measuring circuit 30 to a downstream device such as a controller for further processing and display.

In use, the ionization gauge transducer is attached to the vacuum system whose gas pressure is to be measured. Attachment is by means of a Conflat flange or other well-known means.

In use, the ionization gauge 18 measures an unknown pressure in the vacuum system in terms of an indicated pressure, $P_x$, and a gas temperature $T_x$. These measured values are output as representative electrical current values, which then are continuously output to the ionization gauge controller (not shown in FIG. 1) for processing.

The microprocessor in the ionization gauge controller is programmed by software methods well-known in the art to periodically carry out the following steps in order:

1. Identify a specific value of indicated pressure, $P_x$, corresponding to a specific value of unknown gas pressure in the system.
2. Identify the gas temperature, $T_x$, that prevails in the transducer at the indicated pressure, $P_x$.
3. Insert the identified values of $P_x$ and $T_x$ into the stored equation for gas temperature and gauge reading to obtain the temperature corrected gauge reading.
4. This temperature corrected reading is then inserted into the equation for gauge reading and pressure to calculate the pressure in the gauge, $P_{oc}$.
5. Output the value, $P_{oc}$, as the corrected measured value of the unknown system pressure.

By repeating the above steps on a sufficiently frequent time schedule, a continuous measurement of the corrected pressure in the system can be displayed independently of changes in temperature of the gas in the transducer 18.

Figure 2:
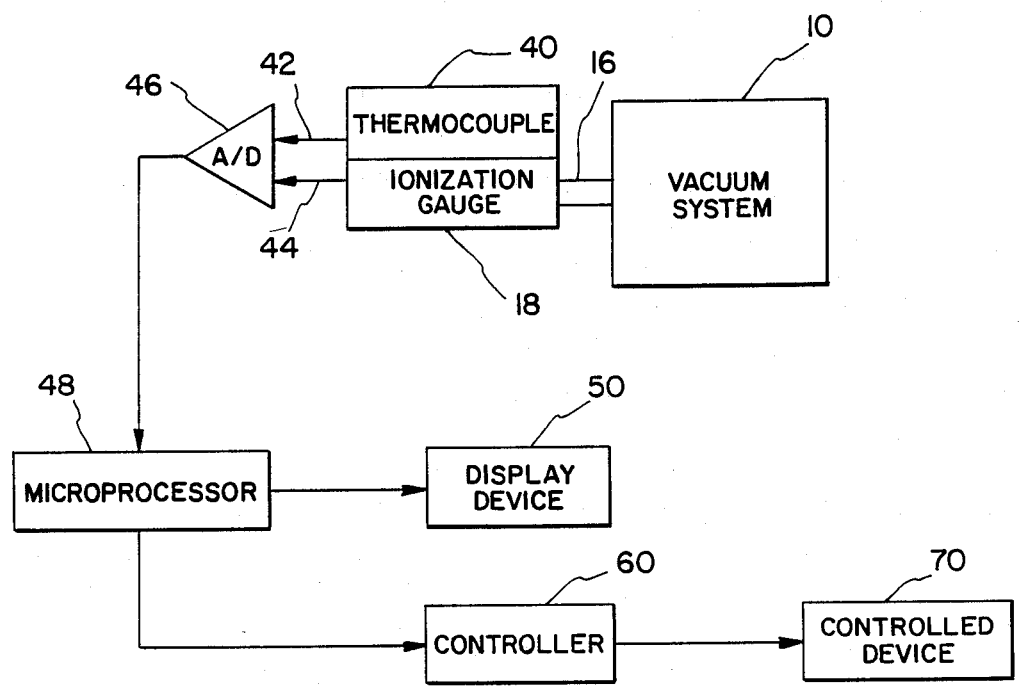
FIG. 2 is a schematic diagram of the elements usable in the present invention.

The foregoing steps are further illustrated with reference to FIGS. 2 and 3. In FIG. 2, the circuit elements and system elements of the present invention are illustrated schematically. A vacuum system 10 communicates with an ionization gauge 18 and a temperature gauge such as a thermocouple 40 by a conduit 16.

The temperature gauge 40 sends an output signal indicated as signal 42 to an A/D converter 46. Similarly, the ionization gauge 18 transmits an output signal indicated as signal 44 to the A/D converter 46. The processed output signals from the converter 46 are supplied to a microprocessor 48.

The microprocessor 48 as shown in FIG. 2 preferably contains a memory such as a RAM memory, disk memory, tape memory, or any other available memory means. The microprocessor 48 itself can be any commercially available microprocessor capable of accessing stored information and of conducting the types of calculations used in the lookup table or in a curve-fit algorithm. The microprocessor 48 preferably contains a RAM memory 82 such as is seen in FIG. 3. The microprocessor 48 then communicates with a downstream device such as a display device 50 or a controller 60. If a controller 60 is used, it then produces an output signal to control a controlled device 70. Such a controller 60 might be, for example, a safety shutdown device to shut down a process of the system if the pressure exceeds a predetermined level. In such a case, the controlled device 70 might be, for example, a system control device which controls ongoing processes in the system whose pressure is being measured.

Figure 3:
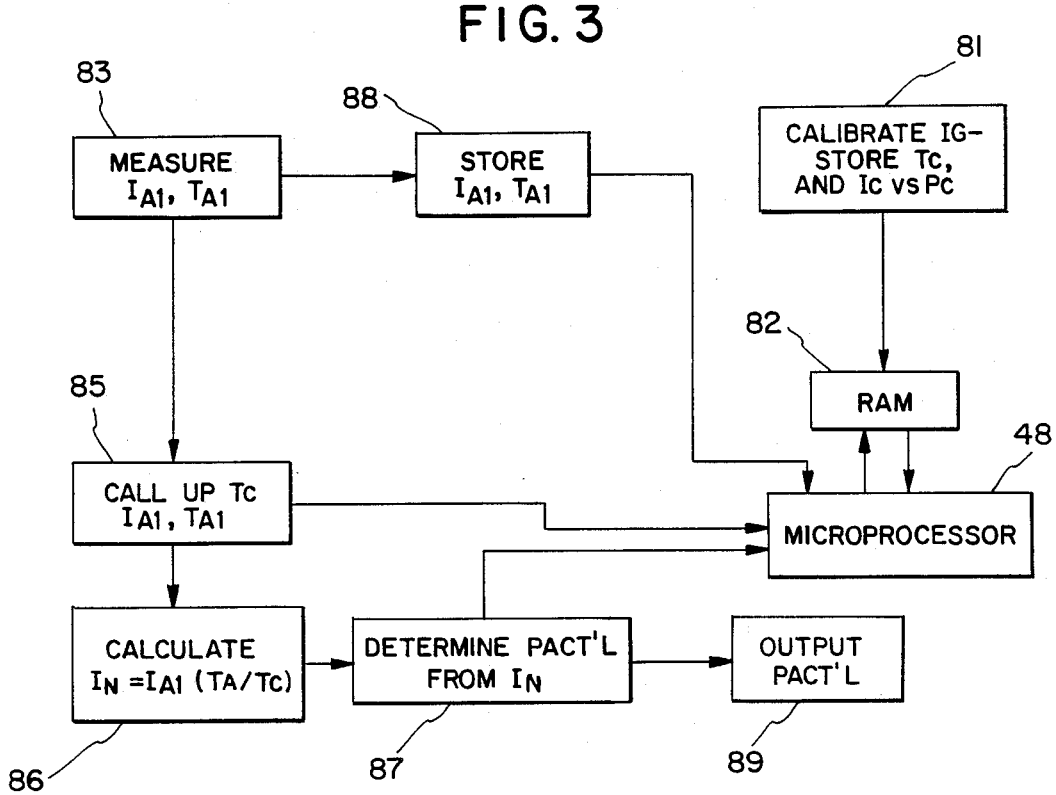
FIG. 3 is a flow chart diagram illustrating the steps used in obtaining the system pressure compensated for temperature.

The procedure whereby the actual system pressure is calculated is shown schematically in FIG. 3. First, the ionization gauge (IG) is calibrated. The calibration of the ionization gauge is necessary in order to define a curve or series of curves, or alternatively to define a lookup table, for the ionization gauge output current $I_c$ versus the actual system pressure $P_c$ during the calibration procedure. During the calibration procedure, the ionization gauge is maintained under controlled conditions, as is the vacuum calibration system, such that the temperature of the gas being measured is at a measured temperature in the gauge of $T_c$, the temperature $T_c$ being in absolute degrees Kelvin or Rankine.

As shown schematically in FIG. 3, a calibration step 81 is used to provide the calibration data described above. The calibration information is supplied, in either algorithm form or lookup form, to a memory device 82 (such as a RAM) which can be part of a microprocessor 48, or which alternatively can be an accessory to the microprocessor 48. Thus, the microprocessor 48 as seen in FIG. 3 can access the calibration data in the memory device 82 when called upon to do so.

An ionization gauge such as the gauge 18 of FIG. 1 is used to measure the actual ionization current $I_{A1}$ and a temperature gauge such as gauge 40 is used to measure the absolute temperature of the gas in the vacuum gauge 18 and is indicated as temperature $T_{A1}$. This step is indicated schematically at block 83 of FIG. 3.

The measured values are then stored in the memory 82 by the microprocessor 48 as indicated by block 88 of FIG. 3. As seen in the foregoing discussion, the calibration data does not take into account the variation with temperature of the gas in the vacuum gauge 18.

While FIG. 3 shows a schematic procedure for determining pressure of a gas in a vacuum system 10, it is contemplated that information relating to a variety of different gases can also be stored including their calibration curves, and that the particular gas being used can be input in the method step shown in FIG. 3 so that the microprocessor 48 can select the appropriate calibration curve information for the particular gas being measured. All such embellishments and modifications are contemplated as being within the scope of the present invention.

At the next step in FIG. 3, the values of relevant parameters are called up from the memory 82 via the microprocessor 48. In particular, the temperature of the gas measured during calibration $T_c$ is called up, as is the aforementioned ionization gauge output current $I_{A1}$ and the measured temperature of the gas in the gauge $T_{A1}$.

As seen at block 86 in FIG. 3, the aforementioned information is used to calculate a new ionization current value $I_N$ which can be used to determine the temperature-corrected gas system pressure from the calibration information. The equation used is as follows:

$$I_N = I_{A1}(T_{A1}/T_C) \qquad \text{(Eqn. 3)}$$

The new ionization current is calculated as $I_N$ and is then supplied to the microprocessor for lookup in the calibration data to determine a temperature-compensated value of pressure of the gas in the vacuum system 10 as $P_{ACTL}$. The temperature-compensated value of the pressure is then output as seen at block 89 of FIG. 3 as $P_{ACTL}$.

Where accurate curve fitting requires that more than one equation be used to represent the dependent variable over the entire span of the independent variables, referring to the enumerated steps listed hereinabove, an additional step is required between steps 2 and 3 and steps 3 and 4. Each such additional step consists of identifying which of the several stored equations to use. Such identification is readily accomplished using suitable IF-THEN statements by those skilled in the software art.

The family of interrelated requirements according to the present invention are:

1. A gas density gauge providing a reading of K times D, where K is relatively constant, and D is gas density.

2. A thermal sensor providing a reading of j times T at an appropriate location in gauge, where j is a constant and T is the temperature, or alternatively providing a reading from which jT can be computed.

3. A computer related controller which is able to store critical data and perform appropriate look-up, calculation and display, as well as operate the gauge functions.

4. Software for automatic operation in at least one of the following modes:

a. Gauge which is linear in D, and has directly calculable temperature effects. Calibration—direct or by class, etc., one pressure point, $P_o$, data=$D_o K$, $jT_o$. Compute and store calibration factor C.

$$\text{Calibration factor} = P_o/D_o k = C \qquad \text{(Eq. 3)}$$

Multiplication of gauge reading by calibration factor gives correct pressure reading at the calibration temperature. However, when, the gauge is used at a temperature which gives a reading jT, Equation 4 provides the temperature corrected pressure reading as follows:

$$P = DKCjT/jT_o \qquad \text{(Eq. 4)}$$

Thus, C and $jT_o$ are placed in memory and used in the computation of Equation 4 for every incoming data set of DK and jT. Such storage and computation are possible by many well-known techniques.

Computed values of P are then displayed and used for control purposes in ways well-known in the art.

b. Gauge non-linear in D, and which has directly calculable temperature effects. Calibration—directly or by class, of multiple pressure points, $P_i$, over a full range at a measured temperature of the gauge, $jT_o$. Data is represented by $D_i k$ vs. $P_i$, $jT_o$.

Data representing $P_i$ and $D_i k$ are stored in tabular form or preferably have a smooth curve fit through them by well-known curve fitting techniques, and only the algorithm and a few required constants are stored.

When the gauge is used at a temperature which gives a reading $jT_i$ and Dk, Equation 5 provides the temperature corrected reading.

$$D_i K = DkjT/jT_o \qquad \text{(Eq. 5)}$$

Then, $P_i$ is estabished by entering $D_i k$ in the stored algorithm or iterating to obtain it from the data stored in a table, whichever storage technology is employed.

Values of $P_i$ are then displayed and can be used for control purposes in ways well-known in the art.

Some prior art thermal gauges have relatively crude temperature corrections, but they fail to meet the requirements that the present approach provides. On the other hand, the ionization gauges and discharge gauges do not seem to have any reported systems for measuring the gas temperature. As indicated earlier, there are possibilities of generating crude temperature measurements using the electrodes in some existing gauges. In some cases, even the envelope temperature may provide some level of correction. However, this is typically a poor correction, especially if the conductance into the gauge is significant. If the gauge involves a rather closed structure at a fixed or measured temperature and with a small conductance to the system being measured, the closed structure controls the temperature of the gas being measured. This appears to be the most effective system for measuring the gas temperature. Measurement of the temperature of such a closed structure is possible by many known temperature sensing techniques.

An alternate density correction approach is discussed hereunder. This approach can be used in the foregoing embodiment to correct for temperature effects upon measured pressures.

There is another type of question which can arise, namely whether the pressure, P, is the same in all locations of the vacuum system, including the gauge. There are two cases where a pressure difference can occur:

1. gas flow effects due to flowing gas
2. thermal transpiration

If the gauge is clean and has operated for a few hours continuously under reasonably constant conditions, the gas flow problems from pumping and/or outgassing are very small. Thermal transpiration is involved only when the mean free path is larger than a small entry. The gauge of the present invention is preferably used under conditions that avoid both of these effects.

In an ionization gauge the ion current, $i_+$, is proportional to the product of the emission current, $i_-$, and the number of gas molecules present $n_{gauge}$, where $$i_c \text{ is proportional to } (i_-)(n_{gauge}) \qquad \text{(Eq. 6)}$$

$$i_c = (K)(i_-)(n_{gauge}) \qquad \text{(Eq. 7)}$$

The fundamental gas law can also be used to define the number of gas molecules present in the gauge:

$$P = (n_{gauge})(k)(T_{gauge}) \qquad \text{(Eq. 8)}$$

Solving for $n_{gauge}$ gives:

$$n_{gauge} = P/(k\ T_{gauge}) \qquad \text{(Eq. 9)}$$

Substituting Equation 9 into Equation 7 gives:

$$i_c = (K\ i_- P)/(k\ T_{gauge}) \qquad \text{(Eq. 10)}$$

The classical equation for the ion gauge is Eq. 11:

$$i_c = S\ i_- P \qquad \text{(Eq. 11)}$$

Placing Eq. 10 in this same form gives Eq. 12:

$$i_c = (K/(k\ T_{gauge}))\ i_- P \qquad \text{(Eq. 12)}$$

Thus, $$S = K/(k\ T_{gauge}) \qquad \text{(Eq. 13)}$$

Thus, S is temperature dependent, and not a constant as has been assumed in the previously known literature.

Previous explanations for this laxity may have been made on the basis that the gauge was calibrated to obtain S at a temperature very similar to that of its use. Thus, S involves an absolute temperature very similar to the $T_{gauge}$ used here.

$$S_{cal} = K/(k\, T_{gauge/cal}) \quad \text{(Eq. 14)}$$

$$S_{use} = K/(k\, T_{gauge/use}) \quad \text{(Eq. 15)}$$

$$S_{use}/S_{cal} = T_{gauge/cal}/T_{gauge/use} \quad \text{(Eq. 16)}$$

Thus, the ratio of use sensitivity to calibration sensitivity is simply the ratio of the absolute temperatures inverted.

If the gauge temperature of calibration was 100° C. = 373° K., and the use temperature is 110° C. = 383° K., then the ratio of use sensitivity to calibration sensitivity is:

$$S_{use}/S_{cal} = 373/383 = 0.9739$$

Thus, there is a nearly 3% error per 10 degrees difference from the calibration, or ⅓% per degree C. difference.

Corrections for this fundamental error form a basis of the novel features of the present application.

While a preferred embodiment has been shown and described, it will be understood that the present invention is not limited thereto, but may be otherwise embodied within the scope of the following claims.

What is claimed is:

1. An apparatus for determining a temperature-compensated value of a pressure measurement of a gas, comprising:
 a gauge means responsive to the density of said gas for connection to a system containing said gas; said gauge means producing an electrical output signal in response to the density of the gas in the gauge;
 a means for storing calibration data of said gas, the calibration data being obtained at a measured calibration gas temperature in the gauge and including data relating said electrical output signal to predetermined values of pressure during calibration;
 a temperature measuring means for measuring temperature of gas in the gauge where pressure is to be determined;
 a computer means for temperature-compensating said electrical output signal based upon actual measured temperature of the gas in the gauge as measured by said temperature measuring means;
 whereby said computer means uses said temperature-compensated electrical output signal to determine a temperature-compensated pressure value of the gas in the gauge.

2. An apparatus as claimed in claim 1, wherein said temperature-compensated electrical output signal is obtained by multiplying the electrical output signal produced by the gauge means by the temperature of the gas measured by the temperature measuring means, and dividing the latter product by the temperature of the gas during calibration, the aforesaid temperatures being expressed in absolute degrees.

3. An apparatus as claimed in claim 1, wherein said gauge means is an ionization gauge.

4. An apparatus as claimed in claim 1, wherein said computer means has a RAM memory for storage of calibration data.

5. An apparatus as claimed in claim 1, wherein said computer means employs a calibration algorithm for determining a nominal pressure at a given current value.

6. An apparatus as claimed in claim 1, wherein said computer means includes a storage means for storing the calibration data of nominal pressure versus output current in table form.

7. An apparatus as claimed in claim 1, further comprising an ionization gauge controller means for controlling said gauge means.

8. An apparatus as claimed in claim 1, wherein said temperature measuring means is a transducer having a tungsten element in thermal contact with the gas whose pressure is to be measured.

9. An apparatus as claimed in claim 1, wherein said temperature measuring means is a second electron emitter.

10. An apparatus as claimed in claim 1, wherein said temperature measuring means is a thermocouple.

11. An apparatus as claimed in claim 1, wherein said gauge means is a Bayard-Alpert gauge.

12. A method for determining a temperature-compensated pressure value of a gas in a system, comprising the steps of:
 (a) providing a gas density responsive gauge connected to the system, said gauge producing an electrical output signal in response to the density of the gas in the gauge;
 (b) providing a gas temperature measuring means for measuring the temperature of the gas in the gauge;
 (c) measuring the temperature and density of the gas in the gauge;
 (d) providing calibration data of the gas at a given calibration temperature of the gas in the gauge for converting electrical output signals from said gauge into calibrated pressure values;
 (e) providing a computer means;
 (f) using said computer means to calculate a temperature-compensated electrical output signal based upon the measured temperature of the gas in the gauge, the electrical output signal produced by the gauge, and said given calibration temperature; and
 (g) obtaining a temperature-compensated pressure value from said calibration data which corresponds to said temperature-compensated electrical output signal.

13. A method as claimed in claim 12, wherein said gauge is an ionization gauge.

14. A method as claimed in claim 12, wherein the calibration data is stored as a calibration curve.

15. A method as claimed in claim 12, wherein said calibration data is stored as a lookup table.

16. A method as claimed in claim 12, wherein said computer means is a microprocessor, and said calibration data is stored in RAM memory.

* * * * *